(12) United States Patent
Frank

(10) Patent No.: US 9,472,865 B2
(45) Date of Patent: Oct. 18, 2016

(54) SCREW CONNECTING ELECTRICAL CONDUCTORS WITH A SHEARABLE SCREW

(71) Applicant: Pfisterer Kontaktsysteme GmbH, Winterbach (DE)

(72) Inventor: Erich Frank, Hochdorf (DE)

(73) Assignee: PFISTERER KONTAKTSYSTEME GMBH, Winterbach (DE)

( * ) Notice: Subject to any disclaimer, the term of this patent is extended or adjusted under 35 U.S.C. 154(b) by 0 days.

(21) Appl. No.: 14/406,249

(22) PCT Filed: Jun. 24, 2013

(86) PCT No.: PCT/EP2013/001858
§ 371 (c)(1),
(2) Date: Dec. 8, 2014

(87) PCT Pub. No.: WO2014/000881
PCT Pub. Date: Jan. 3, 2014

(65) Prior Publication Data
US 2015/0155640 A1 Jun. 4, 2015

(30) Foreign Application Priority Data
Jun. 29, 2012 (DE) .......... 10 2012 013 176

(51) Int. Cl.
| H01R 11/09 | (2006.01) |
| H01R 4/30 | (2006.01) |
| H01R 4/36 | (2006.01) |
| F16B 31/00 | (2006.01) |
| F16B 31/02 | (2006.01) |
| F16B 33/02 | (2006.01) |

(52) U.S. Cl.
CPC .............. *H01R 4/307* (2013.01); *F16B 31/00* (2013.01); *F16B 31/021* (2013.01); *F16B 33/02* (2013.01); *H01R 4/36* (2013.01)

(58) Field of Classification Search
CPC ....................................... H01R 4/363
USPC ....................................... 439/797
See application file for complete search history.

(56) References Cited

U.S. PATENT DOCUMENTS

| 3,209,454 | A | * | 10/1965 | Nissen ............... B26B 21/32 30/41.8 |
| 3,343,443 | A |   | 9/1967 | Moore |
| 4,662,693 | A | * | 5/1987 | Hutter ............... H01R 12/775 439/314 |
| 5,266,058 | A | * | 11/1993 | Sako ............... H01R 4/301 439/709 |
| 5,379,505 | A | * | 1/1995 | Reed ............... B23G 5/06 29/402.11 |

(Continued)

FOREIGN PATENT DOCUMENTS

DE 25 14 206 A1 10/1976
DE 32 07 975 A1 9/1983

(Continued)

*Primary Examiner* — Abdullah Riyami
*Assistant Examiner* — Thang Nguyen
(74) *Attorney, Agent, or Firm* — Wenderoth, Lind & Ponack, L.L.P.

(57) ABSTRACT

A shearable screw (20) of device (1) screw-connects electrical connectors (2, 4). The device has a thread section (22) for screwing the shearable screw (20) into a terminal body (10). The thread section (22) has a thread with an asymmetrical thread profile at least in certain sections, in particular, in that the thread section (22) has a saw thread at least in certain sections. A system (40) has such shearable screw (20) and a thrust element (30).

19 Claims, 3 Drawing Sheets

(56) References Cited

U.S. PATENT DOCUMENTS

| | | | | |
|---|---|---|---|---|
| 7,048,561 B1* | 5/2006 | Elbaz | ................... | H02G 3/088 |
| | | | | 174/652 |
| 7,214,108 B2* | 5/2007 | Barnett | ................ | F16B 31/021 |
| | | | | 439/797 |
| 2001/0002348 A1* | 5/2001 | Mountford | .......... | H01R 13/622 |
| | | | | 439/607.41 |
| 2002/0002006 A1* | 1/2002 | Nakayama | ........... | F16B 37/002 |
| | | | | 439/625 |
| 2004/0067697 A1* | 4/2004 | Zahnen | ................... | H01R 4/36 |
| | | | | 439/798 |
| 2004/0260283 A1* | 12/2004 | Wu | ................... | A61B 17/7032 |
| | | | | 606/270 |
| 2006/0083603 A1 | 4/2006 | Jackson | | |
| 2006/0110986 A1* | 5/2006 | King, Jr. | ................. | H01R 4/36 |
| | | | | 439/709 |
| 2006/0160434 A1* | 7/2006 | Pettersen | ............. | F16B 5/0258 |
| | | | | 439/801 |
| 2008/0039848 A1 | 2/2008 | Jackson | | |
| 2008/0166929 A1* | 7/2008 | Fong | ........................ | H01R 4/36 |
| | | | | 439/797 |
| 2009/0311921 A1* | 12/2009 | Kaine | .................... | H01R 4/363 |
| | | | | 439/798 |
| 2012/0146327 A1* | 6/2012 | Watts | ...................... | F16L 15/06 |
| | | | | 285/332 |
| 2014/0141896 A1* | 5/2014 | Shimizu | .................. | B23G 1/02 |
| | | | | 470/1 |
| 2014/0322994 A1* | 10/2014 | Keeven | ................. | H01R 13/03 |
| | | | | 439/886 |

FOREIGN PATENT DOCUMENTS

| | | |
|---|---|---|
| DE | 10 2004 039 811 A1 | 2/2006 |
| DE | 20 2006 008 314 U1 | 10/2007 |
| EP | 2 375 502 A1 | 12/2011 |

\* cited by examiner

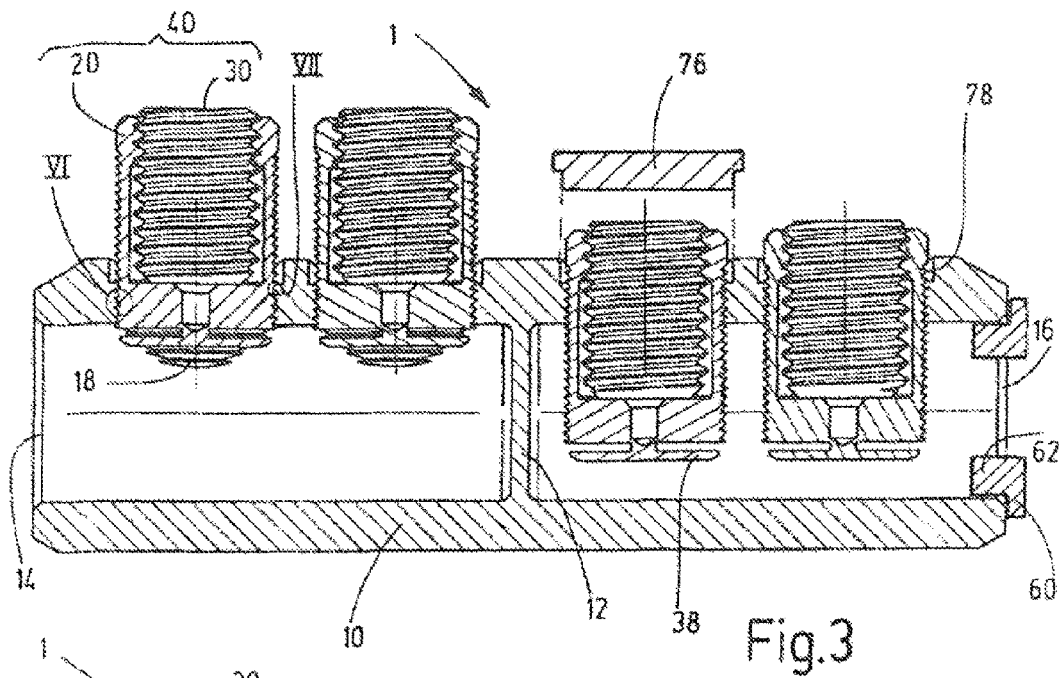
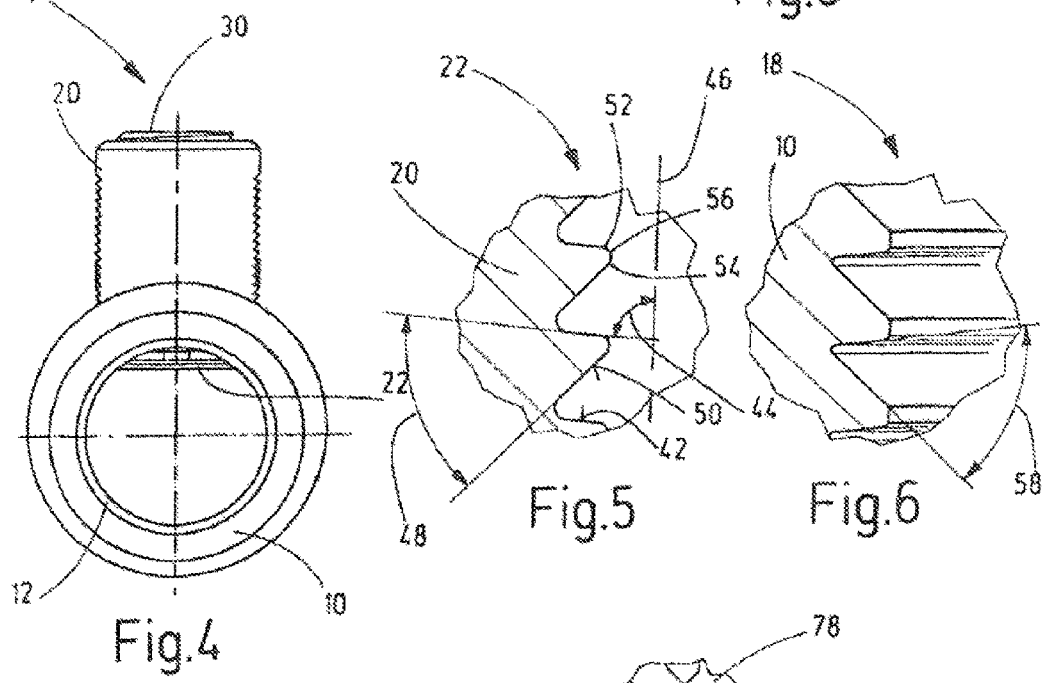
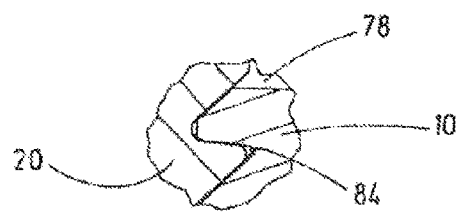

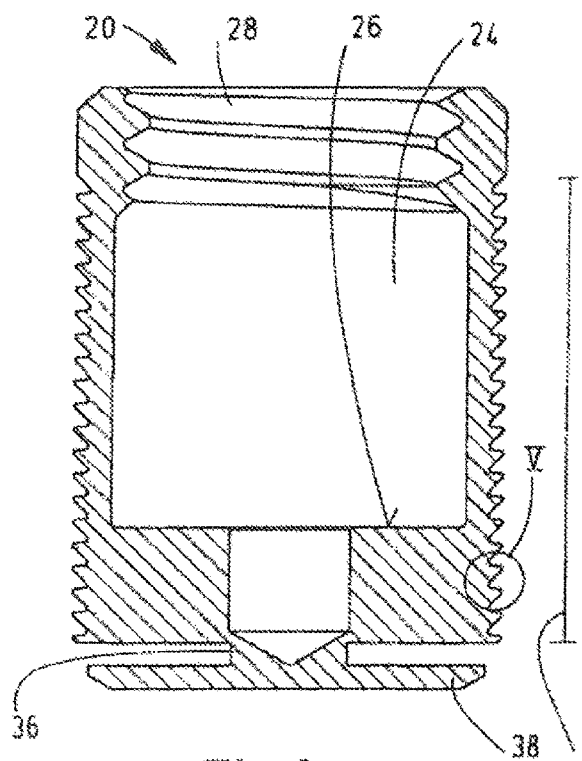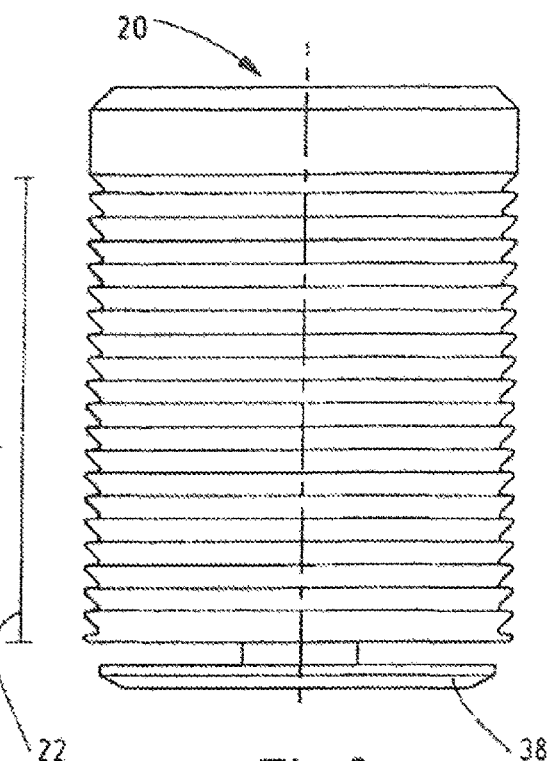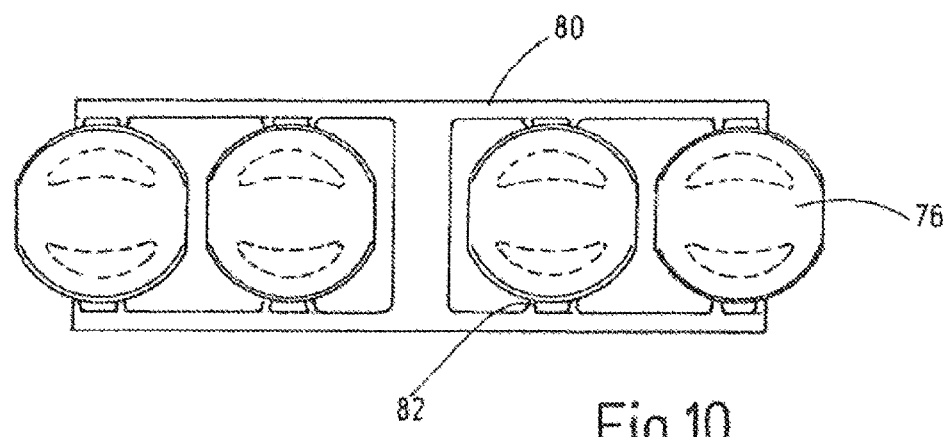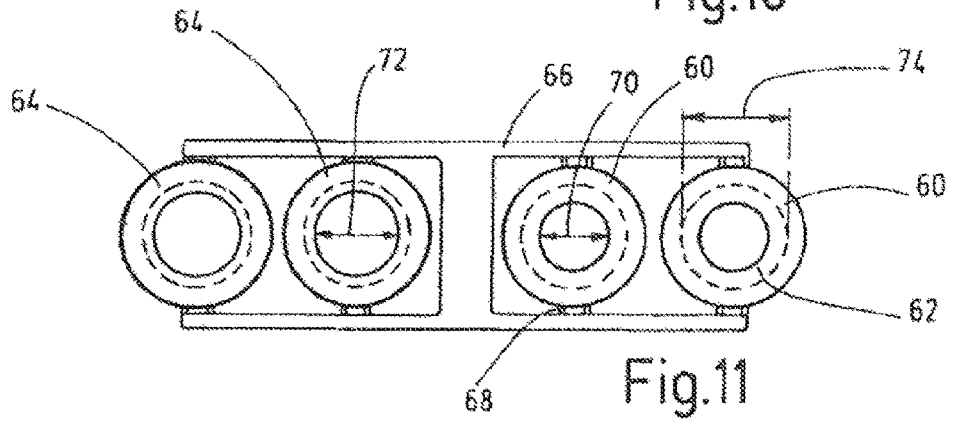

SCREW CONNECTING ELECTRICAL CONDUCTORS WITH A SHEARABLE SCREW

FIELD OF THE INVENTION

The invention relates to a shearable screw, an associated system having such a shearable screw and a thrust element, as well as a device for screw-connecting electrical connectors with such a shearable screw.

BACKGROUND OF THE INVENTION

In screw connection technology of electrical cable conductors for energy supply technology, for example, the fastenings of connecting elements, in particular, screw terminals, are required to end near the surface of the terminal body. In particular, the connecting elements must not project beyond the surface of the terminal body, since, after clamping and connecting the conductors, insulating layers are applied over the terminal body, for example, insulating sleeves. Any protrusion above the terminal body adversely affects the performance characteristics of these insulating layers.

Shearable screws are known from DE 10 2004 039 811 A1 and related EP 1 626 187 B1, which fulfill the stated requirements of permanent contact stability and current carrying capacity of the connecting elements, while involving simple handling.

A clamping body is known from EP 2 375 502 A1, into which multiple shearable screws may be threaded.

A fastening arrangement is known from DE 20 2006 008 314 U1 having a head part and a shaft part. A disk is rotatably held at the head part and on the shaft part. The head part and the disk are each covered with a functional coating. During tightening, the disk then does not perform a relative movement with respect to a component. During tightening, the head part always rotates on the disk, but the disk does not rotate on the component.

A device for terminal connection of electrical conductors is known from DE 25 14 206 A1, having a housing that holds a terminal, in which a screw connected to a clamp element may be fixed against a counter support electrically connected to the terminal. The terminal is then part of a U-shaped connecting element permanently anchored in the housing guiding the screw with a buttress thread between its arms provided with buttress thread segments perpendicular to its base forming the counter support.

A self-threading screw having a symmetrical thread profile for use in plastic is known from DE 32 07 975 A1. The flank angle continuously increases from the flank tip to the thread base.

SUMMARY OF THE INVENTION

An object of the invention is to provide an improved shearable screw, an improved system having such a shearable screw with a thrust element, and an improved device for screw-connecting electrical conductors using such a shearable screw, with which the contact stability and current carrying capacity of the connection established with the aid of the shearable screw are improved. One embodiment further simplifies the actuation of the shearable screw, in particular, the clamping of the electrical conductors and the precise shearing of the shearable screw, as well as the establishment of the screw connection.

This object is basically achieved with the shearable screw, with an asymmetrical thread profile at least in sections, an associated system of a shearable screw and thrust element, and an associated device for screw-connecting electrical conductors.

In one embodiment, the asymmetrical thread profile has at least one section with a buttress thread. As a result, a greater clamping force of the shearable screw is achievable, compared to known shearable screws with their metric ISO threads at the same torque. Because of the compression surfaces, which are less angular as compared to metric threads, the friction in the threads is also less, since pressure is applied virtually perpendicular to the loaded thread flank. In metric threads, the flank is angled by 30°, resulting in the formation of lateral forces that increase friction and may result in loss of forces.

In one embodiment, the threaded region, situated between a first end and a second end opposite thereof in the longitudinal direction of the shearable screw, includes a buttress thread as an outer thread over at least a portion of its axial extent, preferably over the entire axial length. The shearable screw includes a bore open at least toward one end. The bore includes an axial support for a thrust element insertable in the bore. By the thrust element, a compression force may be introduced in the shearable screw when inserting the shearable screw on the support. At the same time, a tensile force may be introduced in a section of the shearable screw closer to the first end. In this way, a tensile force may be exerted causing a shearing of the shearable screw.

In one embodiment, one flank of the asymmetrical thread profile, in particular, the flank which is pressure loaded when screwed in, encloses with the longitudinal axis of the shearable screw an angle of greater than 60° and less than 87, in particular, an angle of greater than 70° and less than 87°, and preferably an angle of greater than 80° and less than 87°. In one preferred embodiment, the enclosed angle is 85°, +/−1°.

In one embodiment, the flank angle of the thread profile is greater than 30° and less than 60°, in particular, greater than 40° and less than 55°, and preferably greater than 45° and less than 55°. In one particular embodiment, the flank angle is 50°+/−1°.

Tests conducted have shown that particularly advantageous performance characteristics are achieved by the aforementioned flank geometry. In particular, a self-centering of the shearable screw is achieved when being screwed in, even when connecting conductors consist of individual wires. Also, achieved as a result is a high reproducibility of the resulting shear torque. On the whole, this structure leads to permanent, excellent clamping characteristics of the shearable screw and of the associated screw connector.

In one embodiment, the radial exterior of the asymmetrical thread profile has a defined rounding. In particular, the asymmetrical thread profile has two roundings radially outwardly between the two flanks, with a planar section situated in between. This arrangement also improves the performance characteristics of the shearable screw according to the invention. In particular, the reproducibility of the resulting shear torque is further enhanced. In one embodiment, the axial extent of the planar section parallel to the longitudinal axis of the shearable screw is only a few fractions of one millimeter, in particular, less than 0.2 mm, and preferably less than 0.1 mm.

The object underlying the present invention is also basically achieved by a system including a shearable screw having a thread region situated between a first end and a second end opposite thereof in the longitudinal direction. The threaded region includes an outer thread over at least a portion of its axial extent for threading the shearable screw into an object, in particular for threading the shearable screw into a terminal body of a device for screw-connecting electrical conductors. The shearable screw includes a bore open toward at least the first end with a support. The system further includes a thrust element insertable into the bore. By the thrust element, a compression force may be introduced in the shearable screw at the support by screwing on or in a thread of the fastener of the shearable screw situated in a region between the support and the first end. At the same time a tensile force may be introduced into the shearable screw by the thrust element in the region of the thread. As a result a tensile force may be exerted on the shearable screw to cause a shearing. In this case, the shearable screw is designed as described above, and the thrust element has a coating that enhances the frictional characteristics between the thrust element and the shearable screw. In one embodiment, the coating preferably has a structure that includes zinc lamellas and/or aluminum lamellas.

The thrust element may be coated in addition to or primarily as an alternative to using other lubricants. With the use of the coating, even without complex selection measures during serial production, only a very minimal variation of shear torques can be made to occur. This coating simplifies assembly on the one hand and improves the connecting characteristics on the other hand.

Moreover, tests have shown that, as a result of the coating according to the invention, the duration and type of storage of the shearable screws with the pre-assembled thrust element also have no effect on the coefficients of friction and, therefore, on the shear torque. In this case, coatings, made of or including zinc and/or aluminum lamellas in a preferably inorganic matrix, have proven to be particularly advantageous, in particular when the coating is applied to a thrust element made of steel.

An object underlying the invention is also basically achieved by a device for screw-connecting electrical conductors, in particular, a screw connecting terminal, having a terminal body and at least one shearable screw as described above, which may be threaded into the terminal body. The device may be used, in particular, for connecting conductors and cable conductors in low voltage, medium voltage and high voltage grids. The clamping regions in this case may be between 10 and more than 100 mm$^2$, in particular, also more than 500 mm$^2$. The terminal body may be made of aluminum and/or the shearable screws may be made of brass. The terminal body may be designed, in particular, as a substantially hollow cylinder having threaded bores extending radially in relation to its longitudinal axis for one or multiple shearable screws for each conductor to be connected.

In one embodiment, the terminal body is made of an aluminum material, which has a copper content of more than 0.1%, in particular more than 0.2%, and preferably more than 0.4%. In one embodiment, an aluminum material having a copper content of between 0.5 and 1.1% is used, for example, in accordance with the EN AW-6056 specification.

Selecting such a copper-containing aluminum alloy results in an increase in strength, in particular, an increase in strength of the female thread in the terminal body, into which the shearable screw may be threaded. Furthermore, tests have shown that the relaxation behavior is also further improved as a result, which behavior further improves the permanently secure clamping, in particular, even under the effects of high temperatures and, in particular, of operationally induced temperature fluctuations.

In one embodiment, a lubricant is introduced between the terminal body, in particular, the female thread of the terminal body, and the shearable screw. The lubricant can include a solid lubricant combined with a mineral oil. This lubricant reduces the coefficient of friction between the engaged threads of the shearable screws and the terminal body to increase the clamping force still further.

In one embodiment, the terminal body has at least one opening for introducing the electrical conductor to be clamped. A centering sleeve may be clampingly fixed in this opening, preferably before introducing the conductor. The inner diameter of the centering sleeve is adapted to the outer diameter of the conductor to be clamped, in particular, is somewhat larger. By using one of several centering sleeves having different inner diameters provided, the same metallic terminal body can be adapted in a simple manner to conductors having different outer diameters and used for these. The centering sleeves may be inserted on site by the assembler of the device. For this purpose, for each device, a number of centering sleeves having different inner diameters is expediently enclosed.

In one embodiment, multiple centering sleeves, preferably paired centering sleeves having different inner diameters, are arranged on a holding strip, and are preferably also integrally formed with the holding strip. On the one hand, this arrangement prevents individual centering sleeves from becoming lost when tearing open the packaging bag, or for example, from becoming soiled during use at a construction site when they are inadvertently dropped. Instead, the assembler is able pick up the entire holding strip with all the centering sleeves.

In addition, the assignment of the centering sleeves to the respective conductor cross-sections may be labelled on the holding strip and/or on the centering sleeves themselves, for example, by directly indicating the cross-sectional region. In this way, the assembler may always use the smallest centering sleeves suitable for the conductor to be clamped.

The centering sleeves may be clampingly fixed in the terminal body or in the opening thereof, for example, with the use of an impact tool. The holding strip in this case may function as a hand grip or an assembly aid when the selected centering sleeve is hammered, for example, with a hammer into the opening of the terminal body.

In one embodiment, the associated opening of the terminal body may be closed off with a cover element once the shearable screw is screwed into the terminal body. The cover element may be clampingly fixed in the opening of the terminal body or in an opening of the shearable screw. This cover element further simplifies the assembly of the devices according to the invention.

After the connector has been mounted on the conductors to be connected, a more or less pronounced depression remains in the surface of the device after the shearable screw has been sheared. The depression must be covered when the device is used in some cable fittings. In the past, cover caps or cover elements for this purpose were attached loosely to the device, which cover caps may be inserted in the opening of the shearable screw. In one embodiment, the cover caps according to the invention are affixed to the terminal body, for example, by being clampingly supported in the opening in the terminal body provided for threading in the shearable screw.

In one embodiment, multiple cover elements are disposed together on one holding strip and are preferably integrally formed with the holding strip. This arrangement results in enhanced safety against loss, as opposed to loosely attached cover elements. Moreover, the holding strip may be used as a hand grip or assembly aid when clamping the cover elements to the device, in particular, to the terminal body.

Each of the features mentioned in the claims and in the description may be essential to the invention alone, or in any combination.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 3 is a side view in section through the device of FIG. 1;

FIG. 5 is an enlarged, partial side view in section of area V of the threaded section of the shearable screw of FIG. 8;

FIG. 6 is an enlarged, partial side view in section of area VI of the threaded section of the terminal body of FIG. 3;

FIG. 7 is an enlarged, partial side view in section of area VII of FIG. 3 with the shearable screw screwed into the terminal body;

FIG. 8 is an enlarged, partial side view in section of the shearable screw of FIG. 1;

FIG. 9 is a side view of the shearable screw of FIG. 8;

FIG. 10 is a top view of a total of four cover elements arranged together on a holding strip according to an exemplary embodiment of the invention; and FIG. 11 is a top view of a total of four centering sleeves arranged together on a holding strip according to an exemplary embodiment of the invention.

DETAILED DESCRIPTION OF THE INVENTION

Figure 1:
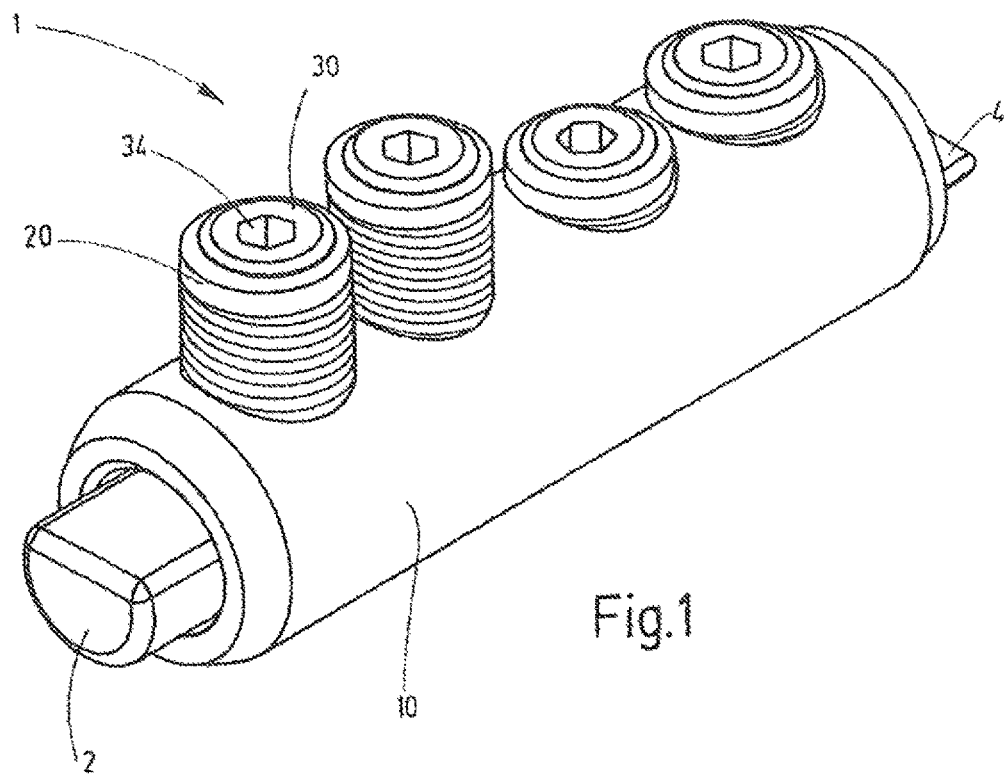
FIG. 1 is a perspective view of a device for screw-connecting two electrical conductors according to an exemplary embodiment of the invention.
Figure 2:
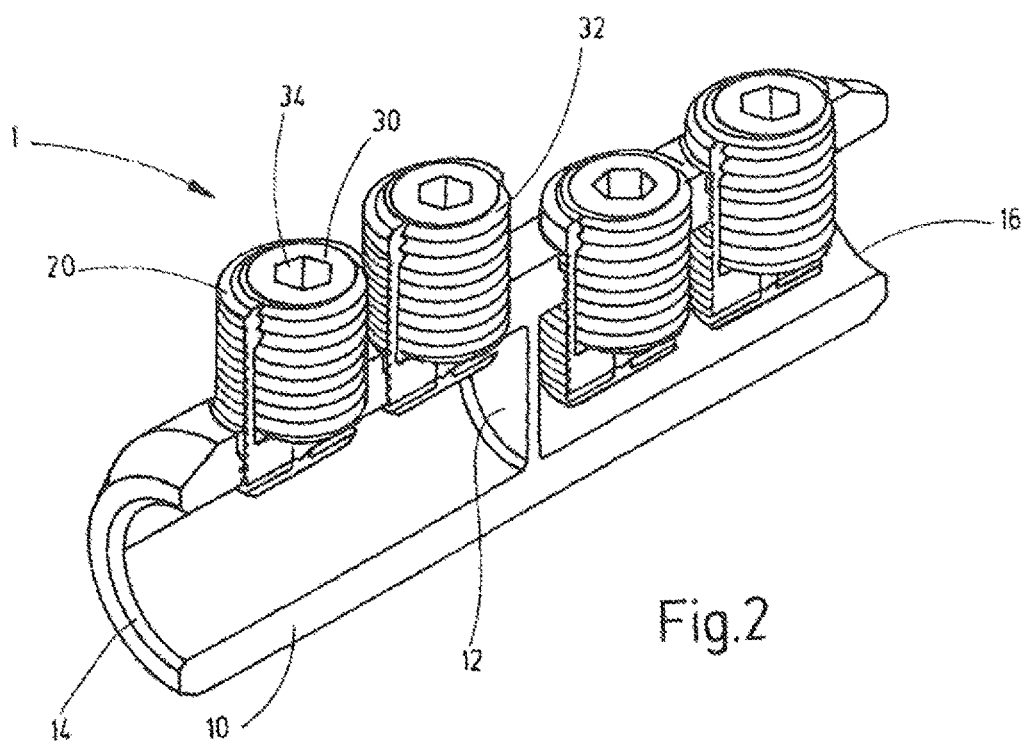
FIG. 2 is a perspective view in section through the device of FIG. 1.

FIG. 1 shows a perspective view of a device 1 for screw-connecting two electrical conductors 2, 4 to a terminal body 10, with a total of four shearable screws 20 screwed or threaded to varying depths into the terminal body 10. FIG. 2 shows a perspective view of a longitudinal section through the device 1 of FIG. 1. FIG. 3 shows a side view of the section through the device 1. FIG. 4 shows a front view of the device 1.

The terminal body 10 is sleeve-shaped and includes a central partition 12 and an axial opening 14, 16 at each end for introducing the conductors 2, 4 to be connected to one another. The terminal body 10 has threaded bores for screwing or threading in the shearable screws 20, which screws extend radially relative to its longitudinal axis and pierce or extend through the cylinder wall. In this exemplary embodiment, two shearable screws are provided for each of the conductors 2, 4 to be clamped. In the left half of the FIGS. 1 through 3, the two shearable screws 20 are in the starting position, for example, in the delivery state of the device 1. In the right half of FIGS. 1 through 3, the shearable screws 20 are in a position largely screwed into the terminal body 10, in which the shearable screws 20 (in FIG. 1 only) clamp the conductor 4 depicted and electrically connect it to the terminal body 10.

FIG. 8 shows an enlarged sectional view of the shearable screw 20. FIG. 9 shows a side view of the shearable screw 20. The shearable screw 20 includes a screw body with a threaded section 22 having an outer thread situated between a first end and a second end opposite thereof in the longitudinal direction. The outer thread has an asymmetrical thread profile, in particular, a buttress thread. FIG. 5 shows an enlarged section V of the threaded section 22 of the shearable screw 20 of FIG. 8. The inner thread 18 of the terminal body 10 also includes a buttress thread. FIG. 6 shows an enlarged section VI of FIG. 3 with the thread 18 of the terminal body 10. FIG. 7 shows an enlarged view of the section VII of the shearable screw 20 with the inner thread 18 screwed into the terminal body 10.

The shearable screw 20 has a bore 24 open toward the first end tapering in the direction of the second end, while forming a step 26. The step 26 forms an axial support for a thrust element 30 insertable into the bore 24, which thrust element is depicted in FIGS. 1 through 4. The shearable screw 20 and the thrust element 30 form a system 40 according to the invention. The shearable screw 20 includes at or near its first end an inner thread 28. The thrust element 30, which has an outer thread 32 mating with inner thread 28, may be screwed or threaded into the shearable screw 20, until the axial end of the thrust element 30 abuts the step 26. The thrust element 30 includes a tool gripping surface for turning, in particular, a hexagonal socket 34. The inner thread 28 and the threaded section 22 on the outside of the shearable screw 20 overlap one another by approximately one thread turn.

Upon further actuation of the thrust element 30, the shearable screw 20 is screwed into the terminal body 10 until a clamping section 38, integrally connected to the shearable screw 20 in the starting position via a tapered predetermined breaking point, abuts the conductor 2, 4 to be clamped. Upon further actuation of the thrust element 30, the clamping section 38 is separated from the shearable screw 20 and is mounted for rotational movement relative to the shearable screw when the shearable screw 20 is screwed in further. When the conductor 2, 4 is fully clamped, the thrust element 30 exerts a force on the shearable screw 20 due to engagement with the inner thread 28 and to the abutment against the support or step 26, as a result of which the shearable screw 20 is sheared off at a suitable point. In the process, high shearing forces are achieved with relatively low torques due to the asymmetrical thread profile in the threaded section 22.

The flank 42 of the threaded section 22, pressure loaded as it is screwed in, encloses together with the longitudinal axis 46 of the shearable screw 20 pressure flank angle 44 of approximately 85°. The flank angle 48 of the asymmetrical threaded section 22 is approximately 50°. The transition between the two flanks 42, 50 includes two roundings 52, 54 radially on the outside with a planar or flat section 56 situated in between. The axial extent of planar section 56 is minimal, for example, merely 0.03 mm, but which results in an improved shearing resistance of the thread 18. The design of the transition between the two flanks 42, 50 prevents a notching effect on the thread 18 of the terminal body 10. Therefore, an unintended corruption as a result of shearing is important, particularly when the terminal body 10, as in the exemplary embodiment, is made of a material softer than the shearable screw 20. The design of the transition between the two flanks 42, 50 combined with the shape of the thread 18 of the terminal body 10 delimits a supply space or displacement space 84 (FIG. 7) for a lubricant introduced between the terminal body 10, in particular the thread 18 of the terminal body 10, and the shearable screw 20. In the exemplary embodiment, the outer diameter of the shearable screw 20 is approximately 18 mm. The length of the terminal body 10 is approximately 108 mm, and the bore of the openings 14, 16 is approximately 20 mm.

The thread 18 of the terminal body 10 is adapted to the asymmetrical threaded section 22 of the shearable screw, in particular, the flank angle 58 (FIG. 6) of the thread 18 is also approximately 50°.

The terminal body 10 is made of an aluminum material, which has a copper content of between 0.5 and 1.1%. For example, the terminal body 10 may be made of an aluminum according to the EN AW-6056 specification. A lubricant is introduced between the terminal body 10 and the shearable screw 20, which lubricant includes a solid lubricant combined with a mineral oil. The thrust element 30 has a coating which has a structure preferably composed of zinc lamellas and aluminum lamellas.

A centering sleeve 60, adapted with respect to its inner diameter to the outer diameter of the conductor 2,4 to be clamped, may be inserted and clampingly fixed in the openings 14, 16 for introducing the conductor 2, 4 to be clamped into the terminal body 10. For this purpose, the centering sleeve 60 forms a nozzle-shaped section 62, the outer diameter of which is slightly larger than the bore of the opening 14, so that the centering sleeve 60, preferably made of a plastic, may be clampingly fixed by an elastic deformation to the opening 14 of the terminal body 10.

FIG. 11 shows a top view of a total of four centering sleeves 60, 64 arranged together on a holding strip 66 and integrally formed with the holding strip as a plastic injection molded part. In this arrangement, the centering sleeves 60, 64 are connected to the holding strip 66 by connecting webs 68. By disconnecting the connecting webs 68, sleeves 60, 64 may be easily separated from the holding strip 66. Pairs of centering sleeves 60, 64 have different inner diameters 70, 72. By selecting the appropriate centering sleeve 60, 64, the device 1 having the identical terminal body 10 may be adapted to different conductor cross-sections of the conductor 2, 4 to be clamped. In this case, the outer diameter 74 of the nozzle-shaped section 62 conforms to the centering sleeves 60, 64 and is compatible with the respective terminal body 10.

Once the shearable screw 20 is screwed in and sheared off, the associated opening in the terminal body 10 may be covered with a cover element 76 (FIG. 3). The cover element 76 in this case is clampingly fixed in the opening of the terminal body 10 or, alternatively, in an opening of the shearable screw 20. In the exemplary embodiment of FIG. 3, the terminal body 10 has a lateral widening 78 of the associated opening, forming a cylindrical wall, to which the cover element 76, made preferably of plastic, is clampingly fixed by elastic deformation. In this way, the opening 24 of the shearable screw 20 is also covered.

FIG. 10 shows a top view of a total of four identically designed cover elements 76 of the device 1. The cover elements are arranged together on a holding strip 80, and are preferably integrally formed with the holding strip 80 as a plastic injection molded part.

The cover elements 76 are connected by easily separable connecting webs 82 to the holding strip 80. As in the case of the centering sleeves 60, so too, in the case of the cover elements 76, the holding strip 66 and 80 may be used as a handle or hand grip when attaching the centering sleeves 60 or the cover elements 76.

While one embodiment has been chosen to illustrate the invention, it will be understood by those skilled in the art that various changes and modifications can be made therein without departing from the scope of the invention as defined in the claims.

The invention claimed is:

1. A shearable screw for connecting electrical leads, comprising:
a shearable screw body with a longitudinal axis; and
a threaded section on said screw body threadable into a bore of a terminal body for retaining electrical leads, said threaded section having an asymmetrical thread profile and including a buttress thread, said thread profile having first and second roundings radially on an outside thereof between first and second flanks of said thread profile and a planar section between said first and second roundings.

2. A shearable screw according to claim 1 wherein
said first flank is a pressure loaded flank when threaded in the terminal body;
said pressure loaded flank and said longitudinal axis enclose a pressure flank angle of greater than 60 degrees and less than 87 degrees.

3. A shearable screw according to claim 2 wherein
said pressure flank angle is greater than 70 degrees and less than 87 degrees.

4. A shearable screw according to claim 3 wherein
said pressure flank is greater than 80 degrees and less than 87 degrees.

5. A shearable screw according to claim 1 wherein
said first and second flanks enclose a flank angle of greater than 30 degrees and less than 60 degrees.

6. A shearable screw according to claim 5 wherein
said flank angle is greater than 40 degrees and less than 55 degrees.

7. A shearable screw according to claim 6 wherein
said flank angle is greater than 45 degrees and less than 55 degrees.

8. A system, comprising
a terminal body having an internally threaded terminal bore and being configured to and capable of receiving electrical conductors therein;
a shearable screw having a threaded region extending between opposite first and second ends of said screw in a longitudinal direction thereof, said threaded region including an outer thread over at least a portion of an axial extent thereof threadable in said terminal bore to secure the electrical conductors in said terminal body, said screw including a screw bore opening toward said first end;
a thrust element being insertable and introduced into said screw bore in a region between a support in said screw bore and said first end of a said screw bore, and applying a compression force applied on said shearable screw at said support by threading said thrust element to a thread of a fastener of said shearable screw, while simultaneously applying a tensile force in said shearable screw in a region of said thread of said fastener causing a shearing; and
a coating on said shearable screw improving frictional characteristics thereof between said thrust element and said shearable screw.

9. A system according to claim 8 wherein
said coating comprises at least one of zinc lamellas or aluminum lamellas.

10. A system according to claim 8 wherein
said shearable screw has a longitudinal axis; and
said threaded region is threadable into said bore of a terminal body for retaining the electrical conductors, said threaded section having an asymmetrical thread profile and including a buttress thread, said thread profile having first and second roundings radially on an outside thereof between first and second flanks of said thread profile and a planar section between said first and second roundings.

11. A device for connecting electrical conductors, comprising:

a terminal body having at least one internally threaded bore;

a shearable screw for connecting electrical leads in said terminal body;

a shearable screw body with a longitudinal axis; and a threaded section on said screw body threadable into said bore of said terminal body for retaining the electrical leads, said threaded section having an asymmetrical thread profile and including a buttress thread, said thread profile having first and second roundings radially on an outside thereof between first and second flanks of said thread profile and a planar section between said first and second roundings.

12. A device according to claim 11 wherein said terminal body is formed of aluminum having a copper content of more than 0.1 percent.

13. A device according to claim 12 wherein said copper content is more than 0.2 percent.

14. A device according to claim 13 wherein said copper content is more than 0.4 percent.

15. A device according to claim 11 wherein a lubricant is between said terminal body and said shearable screw, said lubricant including a solid lubricant mixed with a mineral oil.

16. A device according to claim 11 wherein said terminal body comprises at least one opening receiving and clamping an electrical conductor therein; and a hollow centering sleeve being received in said opening and having an inner diameter matched to an outer diameter of said electrical conductor.

17. A device according to claim 11 wherein said terminal body comprises at least one opening receiving and clamping an electrical conductor therein; and a plurality of hollow centering sleeves having different inner diameters are integrally arranged on a holding strip being receivable in said opening, at least one of said inner diameters matching an outer diameter of said electrical conductor.

18. A device according to claim 11 wherein an opening is in said terminal body outside of said shearable screw after being threaded in said terminal body; and a cover covers and is clampingly fixed in at least one of said opening in said terminal body or an opening of said shearable screw.

19. A device according to claim 18 wherein additional covers are integrally arranged together on a holding strip.

* * * * *